United States Patent [19]

Josefik

[11] Patent Number: 4,956,080
[45] Date of Patent: Sep. 11, 1990

[54] HIGH PRESSURE OXYGEN-SATURATED WATER TREATMENT APPARATUS

[75] Inventor: John Josefik, Berwyn, Ill.

[73] Assignee: Microlift Systems, Incorporated, Sturgeon Bay, Wis.

[21] Appl. No.: 80,993

[22] Filed: Aug. 3, 1987

[51] Int. Cl.$^5$ .............................................. C02F 1/74
[52] U.S. Cl. ................................. 210/109; 210/195.1; 210/197; 210/205; 210/218; 210/221.2; 210/258; 210/262; 261/29; 261/36.1; 261/DIG. 75
[58] Field of Search .................. 210/86, 97, 104, 109, 210/197, 205, 218, 220, 221.1, 221.2, 258, 262, 195.1; 261/29, 36.1, DIG. 75

[56] References Cited

U.S. PATENT DOCUMENTS

| | | | |
|---|---|---|---|
| 118,472 | 8/1871 | Munzinger | 210/220 |
| 1,077,020 | 10/1913 | Walden | 261/76 |
| 1,740,441 | 12/1929 | Ghogo | 261/77 |
| 1,808,956 | 6/1931 | Ketterer | 261/77 |
| 2,126,164 | 10/1935 | Anderson | 210/758 |
| 2,984,463 | 5/1961 | Torricelli | 261/21 |
| 2,994,432 | 6/1961 | Schluter | 210/101 |
| 3,063,938 | 11/1962 | Katz | 210/703 |
| 3,175,687 | 3/1965 | Jones | 210/120 |
| 3,206,032 | 9/1965 | Nottingham et al. | 210/195.3 |
| 3,371,779 | 5/1968 | Hollingsworth | 209/166 |
| 3,530,990 | 9/1970 | Grimshaw | 210/199 |
| 3,671,022 | 6/1972 | Laird et al. | 210/220 |
| 3,725,258 | 4/1973 | Spector et al. | 210/220 |
| 3,731,812 | 5/1973 | Stone | 210/220 |
| 3,772,187 | 11/1973 | Othmer | 210/220 |
| 3,779,913 | 12/1973 | Martin | 210/220 |
| 3,794,171 | 2/1974 | Kimura et al. | 210/220 |
| 3,807,565 | 4/1974 | Langston et al. | 210/201 |
| 3,835,048 | 8/1974 | Walter | 210/758 |
| 3,872,003 | 3/1975 | Walker | 210/220 |
| 3,969,446 | 7/1976 | Franklin, Jr. | 261/93 |
| 4,094,783 | 6/1978 | Jackson | 210/197 |
| 4,100,071 | 7/1978 | Beurer et al. | 210/220 |
| 4,157,304 | 6/1979 | Molvar | 210/220 |
| 4,186,094 | 1/1980 | Hellberg | 210/261 |
| 4,207,180 | 6/1980 | Chang | 210/220 |
| 4,210,534 | 7/1980 | Molvar | 210/220 |
| 4,211,733 | 7/1980 | Chang | 261/123 |
| 4,226,719 | 10/1980 | Woltman | 210/220 |
| 4,376,045 | 3/1983 | Siskind | 210/197 |
| 4,564,457 | 1/1986 | Cairo, Jr. et al. | 210/704 |
| 4,680,119 | 7/1987 | Franklin, Jr. | 210/93 |
| 4,683,122 | 7/1987 | Concordia et al. | 261/DIG. 75 |

FOREIGN PATENT DOCUMENTS

| | | | |
|---|---|---|---|
| 236892 | 4/1964 | Austria . | |
| 2238525 | 2/1975 | France . | |
| 55-51618 | 12/1980 | Japan | 261/DIG. 75 |
| 95365 | 7/1922 | Switzerland . | |

Primary Examiner—Peter Hruskoci
Attorney, Agent, or Firm—Allegretti & Witcoff, Ltd.

[57] ABSTRACT

The improved high pressure oxygen-saturated water treatment apparatus of the present invention functions to provide super-saturated oxygen treatment to waste water for purification thereof. The apparatus includes a pressurized treatment tank having a substantial longitudinal dimension, with a chamber separation plate forming two interconnected chambers in the tank. An input conduit for flowing waste water into the first chamber of the tank is provided. An oxygen input conduit is connected to the tank for providing oxygen-containing gas under substantial pressure within the tank. An oxygen output conduit is also disposed on the tank for receiving the oxygen-containing gas from the tank to form a pressurized oxygen-containing stream. A venturi is also disposed on the tank for receiving and combining the pressurized oxygen-containing stream with recirculated water from the tank to form a combined injection stream of pressurized water which is super-saturated with oxygen, and which is then injected into the treatment water contained within the tank. As the tank is maintained at a pressure lower than that of the injection stream, the pressurized oxygen comes out of solution in tiny bubbles preferentially about particles of solid waste to entrain and provide supplemental floatation thereto. The result is to substantially oxidize any oxidizable material contained within the tank. The treated water is then removed by suitable means from the tank from the second chamber thereof.

44 Claims, 3 Drawing Sheets

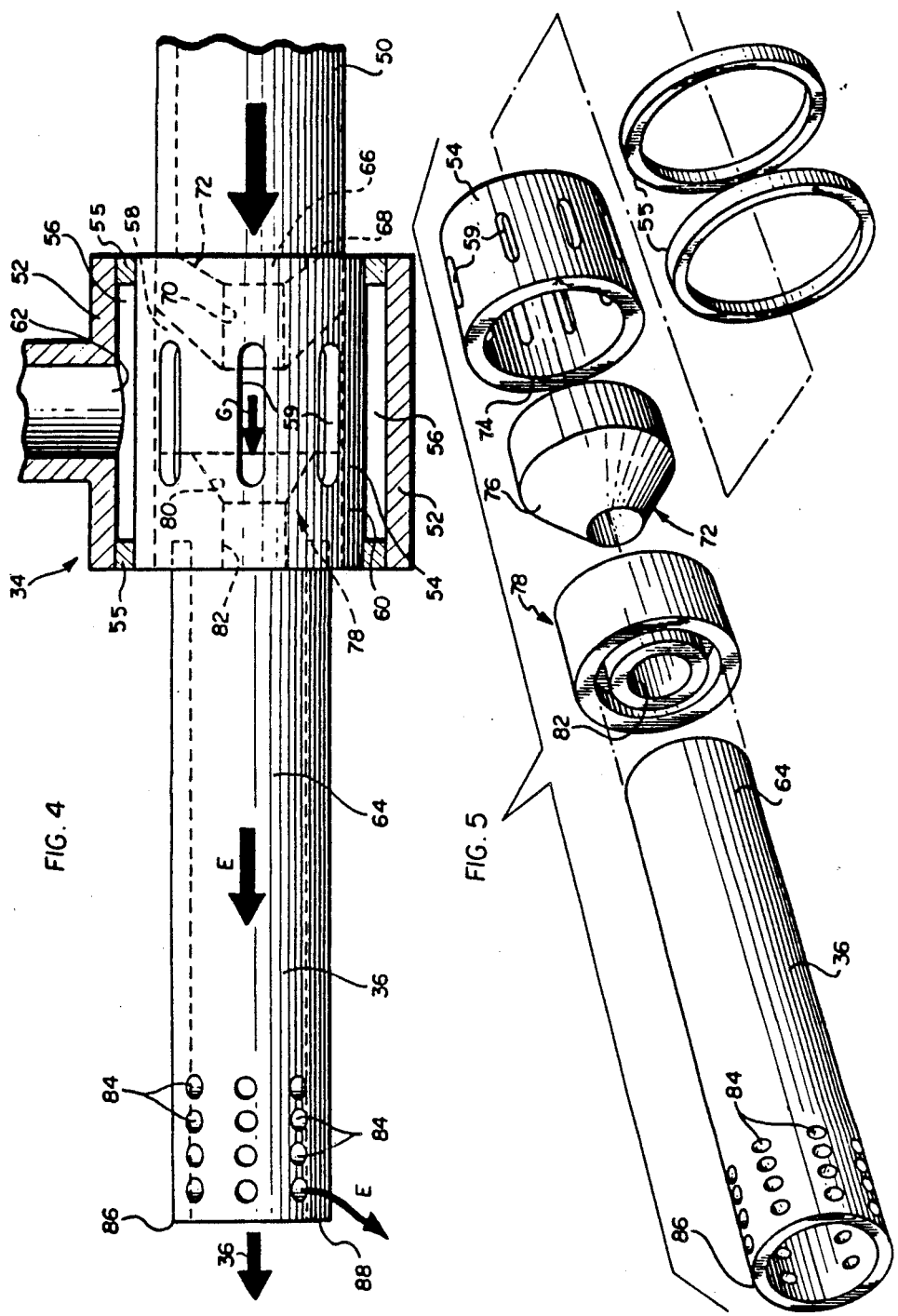

HIGH PRESSURE OXYGEN-SATURATED WATER TREATMENT APPARATUS

BACKGROUND OF THE INVENTION

The present invention relates generally to water treatment apparatus, and more particularly to an improved high pressure oxygen-saturated water treatment apparatus for providing super-saturated oxygen treatment to waste water. Such apparatus may find a wide variety of usages in the treatment of waste water containing human waste, rejuvenation of swamps, cleansing water for cat fish farming, or for agriculture, and/or during mining operations and for a wide variety of usages where it is desirable to purify waste water, or to provide oxidizing and entraining bubbles of oxygen about solid particulate material.

Governmental authorities and others have been making sustained efforts in recent years to limit the volumes and strengths of waste water discharges to bodies of water, such as lakes, rivers and streams. The largest source of contamination of these bodies of water is the category of wastes known as deoxygenating wastes. These materials, which include human sewage as well as certain types of industrial waste water, are typically high in their biochemical oxygen demand, and in their suspended solids levels.

Sewage treatment plants are concerned for the most part with effecting substantial reductions in biochemical oxygen demand and suspended solids levels of raw sewage and industrial waste water before the treatment plant effluent is discharged to a river or the like. Pollution control regulations in effect throughout the United States set limits on permissible levels of biochemical oxygen demand and suspended solids that will be tolerated. Sewage treatment personnel, and industrial waste water treatment firms, are continuously alert for more efficient and economical ways of reducing the concentration and quantity of biochemical oxygen demand containing materials in waste water.

One area which has previously been investigated to some extent involves creation of oxygen-enriched clean water, followed by contact of the oxygen-enriched water with waste water to be treated. The excess oxygen in the enriched water brings about rapid degradation of the wastes, and thereby cleanses the waste water to acceptable contaminant levels.

As indicated, the present invention is concerned with provision of an oxygen-enriched water stream useful for contacting and for the resultant cleansing of waste water. Typically, the waste water to be treated contains suspended solids along with dissolved inorganic and organic contaminants. These contaminants represent a high demand for any available oxygen. Thus, the waste water has relatively high biochemical oxygen demand and relatively high chemical oxygen demand, which are parameters of the polluting characteristics of the waste water.

Upon contact of the waste water with an oxygen enriched water stream, the contaminants of the waste water tend to undergo oxidation. The oxygen-enriched stream tends to satisfy the oxygen demand of the waste water. Thus, the inorganic contaminants oxidize to less soluble oxides, while the organic components are converted to carbonaceous residues and carbon dioxide. The insolublized components then generally rise to the surface of the waste water where they may be removed by any of several techniques, such as surface skimming, for example, which are known to those of ordinary skill in the art.

The gas-liquid combination system of the present invention, which generates the oxygen-enriched cleansing water, utilizes in a novel manner several well-known physical principles. The principal mechanisms by which the oxygen-enrichment is created are believed to be through diffusion and dissolution of the oxygen component of air in water. In the process of diffusing air in water, the system relies on both Henry's Law and Dalton's Law of Partial Pressures.

Under Henry's Law the amount of gas dissolved in a liquid is directly proportional to the pressure of the gas. At standard temperature and pressure (1 atm. at 20 degrees C.), the solubility of air in water is approximately 24. mg/liter. This relationship is linear at constant temperature—i.e., as the pressure increases, so does solubility. As the temperature changes, so does the solubility. The rate of dissolution is inversely proportional to temperature, and approaches zero at both the boiling and freezing points of water. The highest rate of gas dissolution occurs at approximately 4 degrees C., below which temperature the solubility rapidly approaches zero.

Since air is a mixture of gases (approximately 79 percent nitrogen, 20 percent oxygen, and 1 percent rare gases and contaminants), the partial pressure of each gas must be evaluated using Dalton's Law of Partial Pressures. According to this Law, the total pressure of a confined gas mixture equals the sum of the pressures each gas would exert alone in the same volume.

Applying Dalton's Law to the oxygen (molecular weight 16) and nitrogen (molecular weight 14) contents of air, and combining these results with the application of Henry's Law, the following maximum solubilities of these gases in water (at standard temperature of 20 degrees C.) are found:

| Gas Pressure psi | Dissolved Air mg/l | Molecular Fraction | |
|---|---|---|---|
| | | $O_2$ mg/l | $N_2$ mg/l |
| 14.7 | 24.0 | 4.8 | 19.2 |
| 20 | 33.6 | 6.7 | 26.9 |
| 40 | 100.8 | 20.1 | 80.7 |
| 60 | 168.0 | 33.5 | 134.5 |
| 80 | 235.2 | 46.9 | 188.3 |
| 100 | 302.4 | 60.3 | 242.1 |
| 120 | 369.6 | 73.7 | 295.9 |
| 140 | 436.8 | 87.1 | 349.7 |

In a diffused solution, the dissolved gas tends to remain in solution so long as the equilibrium pressure remains undisturbed. Thus, the amount of oxygen dissolved in water in a sealed vessel at, for example 100 P.S.I., will tend to stay in the water until the diffused solution is discharged from the vessel into another vessel under lower pressure or into the atmosphere. Upon such reduction of the pressure to atmospheric, for example, some of the dissolved gas escapes and forms small microscopic-size bubbles (the gaseous form of lowest energy is spherical, hence the formation of bubbles). These bubbles behave in a way predictable by the Nucleus Theory, according to which a gas coming out of solution from a liquid tends to form bubbles of finite nuclei. This concept is used to advantage in utilization of the product of the present invention, as such bubbles tend to collect about small particles of solid material, in this case the suspended waste solids, to form larger particles of lesser specific gravity which tend to rise to the surface, resulting in clarification of the liquid. Such highly air-entrained waste can then readily be skimmed off for disposal.

Accordingly, it is one object of the improved high pressure oxygen-saturated water treatment apparatus of the present invention to provide apparatus which will provide super-saturated oxygen for mixing with waste water to remove suspended waste from such waste water.

It is also an object of the improved high pressure oxygen-saturated water treatment apparatus of the present invention to provide such super-saturated oxygen treatment under substantial pressure to be injected into a containment tank having a reduced pressure, and accordingly to permit such oxygen to come out of solution in the form of tiny bubbles around nuclei of such waste particles, whereby such waste particles may be entrained and floated to the surface.

It is a yet further object of the improved high pressure oxygen-saturated water treatment apparatus of the present invention to provide venturi means which will combine the pressurized oxygen-containing stream with recirculation waste water in a stream under pressure to form a combined injection stream of pressurized water which is super-saturated with oxygen, to be injected into treatment water contained within a treatment tank for substantially oxidizing the oxidizable material contained therewithin.

Upon further review of the specification hereof, additional objects and advantages of the present invention will become apparent to those of ordinary skill in the art.

SUMMARY OF THE INVENTION

The improved high pressure oxygen-saturated water treatment apparatus of the present invention is directed to apparatus for providing super-saturated oxygen treatment to water for purifying waste water. The apparatus includes a pressurized treatment tank having a substantial longitudinal dimension of preferably cylindrical shape. Such tank has therewithin a chamber separation means, preferably in the form of a transversely disposed metal plate, forming two interconnected chambers in the tank.

An input conduit for flowing waste water into the first chamber of the tank is provided. An oxygen input means is also disposed on the tank for providing and for maintaining oxygen-containing gas under substantial pressure within the tank. Oxygen output means are also disposed on the tank for receiving the oxygen-containing gas from the tank to form a pressurized oxygen-containing stream.

A venturi is disposed on the tank for receiving and combining the pressurized oxygen-containing stream with recirculation water from the tank to form a combined injection stream of pressurized water which is super-saturated with oxygen and which is then injected into the treatment water contained within the tank. The result is to substantially oxidize any oxidizable material contained within the tank. The treated water is then removed by suitable means from the tank from the second chamber thereof.

Such pressurized tank may be pressurized preferably to at least approximately 80 to 120 P.S.I., or above, and to contain therewithin oxygen-containing gas pressurized to that pressure.

The venturi means in some preferred embodiments of the improved high pressure oxygen-saturated water treatment apparatus of the present invention includes a venturi housing, and with a gas-liquid mixing container disposed therewithin. Such gas-liquid mixing container in preferred embodiments may include longitudinal slits on the walls thereof. Such walls of the gas-liquid mixing chamber define an exteriorly disposed gas chamber and an interiorly disposed liquid chamber for receipt of treatment water thereinto. Such slots function to define gas input openings in the walls of the mixing container for flowing of the oxygen-containing gas thereinto under substantial pressure to mix with the water contained therewithin.

Gas input means are disposed on the venturi housing for providing oxygen-containing gas to the gas chamber. Liquid input means are provided for providing water to and to flow through the liquid chamber. A mixture injection chamber connected to the venturi housing and for channeling the mixed oxygen-containing pressurized gas and water injection mixture in a direction generally longitudinal of such gas-liquid mixing chamber is further provided.

BRIEF DESCRIPTION OF THE DRAWING

The improved high pressure oxygen-saturated water treatment apparatus of the present invention is depicted in certain preferred embodiments in the accompanying drawing, and in which:

FIG. 4 is a greatly enlarged side elevational view of the venturi means of the improved high pressure oxygen-saturated water treatment apparatus of the present invention, and showing within the venturi housing the slotted gas-liquid mixing container to define an exteriorly disposed gas chamber and an interiorly disposed liquid chamber for respective receipt of oxygen-containing gas and treatment water thereinto, and showing disposed at the opposite end thereof an elongated longitudinally extending mixture injection chamber having in the illustrative embodiment shown in FIG. 4 pressure relief openings in the walls thereof near the distal end thereof; and FIG. 5 is an exploded greatly enlarged side view of the embodiment of the venturi means of the improved high pressure oxygen-saturated water treatment apparatus as depicted in FIG. 4, and further showing the gas input means disposed on the venturi housing for providing oxygen-containing gas to the gas chamber, liquid input means for providing water to and to flow through the liquid chamber, smoothly contoured contraction means defined by a fitting for disposition within the mouth of the gas-liquid mixing chamber, and also gas-liquid mixture reception means in the form of a substantially frusto-conical pickup mouth channeling into a connected and substantially cylindrical output mouth for directing the stream of oxygen-enriched water into the mixture injection chamber.

DETAILED DESCRIPTION OF PREFERRED EMBODIMENTS

Figure 1:
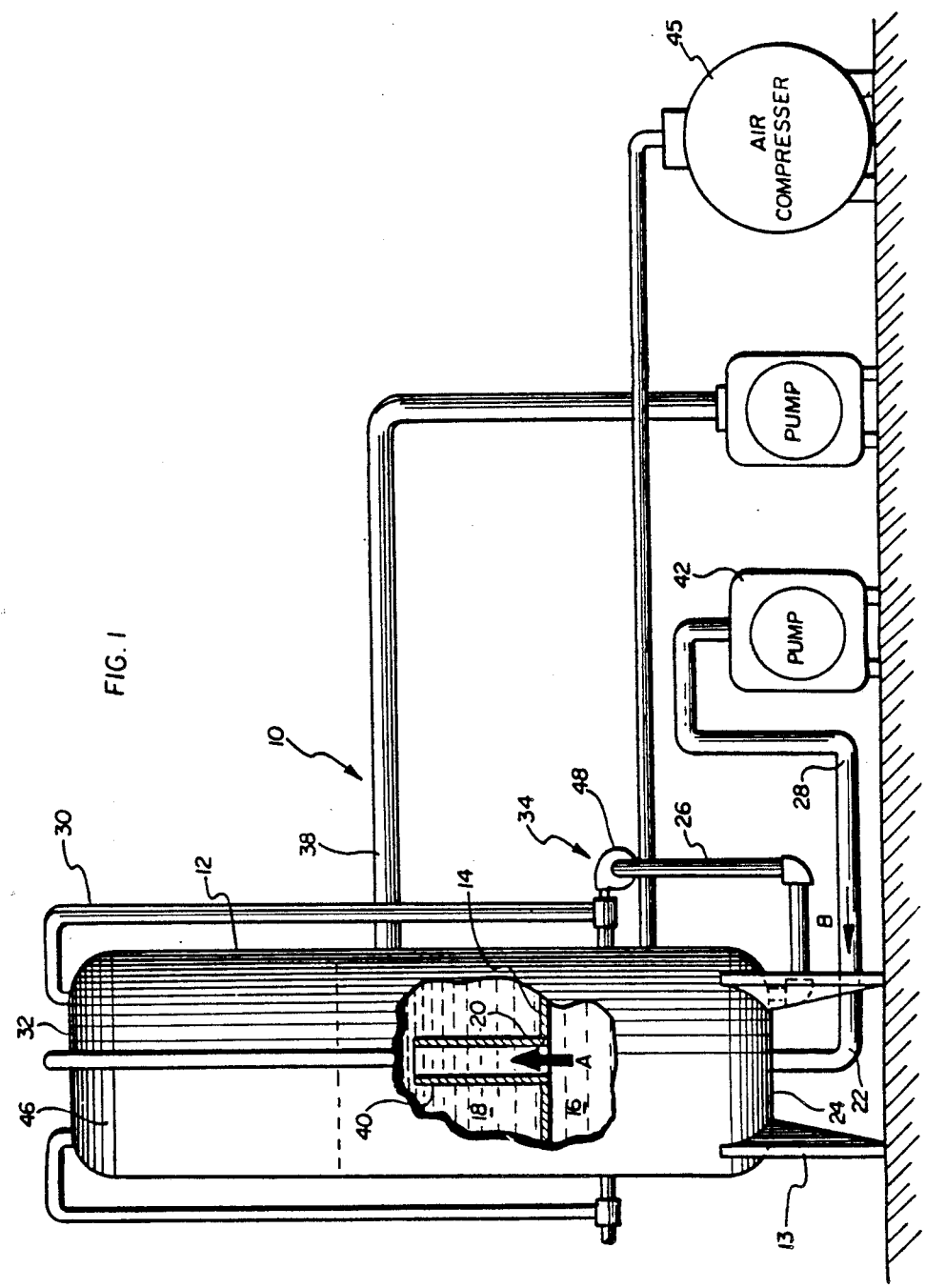
FIG. 1 is a side elevational partially cross-sectional view of a preferred embodiment of the improved high pressure oxygen-saturated water treatment apparatus of the present invention taken along line 1—1 of FIG. 2, and showing the pressurized treatment tank having chamber separation means defining first and second chambers and having a standpipe upwardly disposed from the aperture thereof, and further generally showing the exterior of the venturi means, and with related conduits and pumps.

The improved high pressure oxygen-saturated water treatment apparatus of the present invention functions to provide super-saturated oxygen treatment water, such as various forms of waste water, also known as treatment water, and in some preferred embodiments containing organic materials. Such apparatus includes a pressurized treatment tank having a substantial longitudinal dimension. A chamber separation means is disposed within the pressurized treatment tank for defining two inter-connected chambers within the tank. The chamber separation means, preferably in the form of a transversely disposed metal plate, includes an aperture therein for permitting the flow of water therethrough from a first chamber to a second chamber. Treatment water input means, preferably in the form of a conduit, are disposed on the tank for input of treatment water into the first chamber of the pressurized treatment tank. Recirculation water means are also disposed on the tank for receiving a stream of recirculation water from the tank, and preferably from the bottom portion thereof.

Oxygen input means are disposed on the tank for providing oxygen-containing gas into the tank and for maintaining such oxygen-containing gas under substantial pressure within the tank. Oxygen output means are disposed on the tank for receiving the pressurized oxygen-containing gas from the tank to form a pressurized oxygen-containing stream. A venturi is disposed on the tank for receiving and combining the pressurized oxygen-containing stream with the recirculation water stream, and under substantial pressure, to form a combined injection stream of pressurized water which is super-saturated with oxygen, and which combined injection stream is injected into the treatment water contained within the tank for substantially oxidizing any oxidizable material contained within such treatment water. Such combined stream is injected in preferred embodiments into the first chamber of the tank. Treated water output means are also disposed on the tank for output of treated water, which contains substantially reduced levels of oxidizable contaminants, such treated water output preferably disposed for removal of treated water from the second chamber of the tank.

The oxygen output means in preferred embodiments is disposed at the top of the tank. The pressurized treatment tank is substantially cylindrical in preferred embodiments in external configuration, and may be pressurized to at least approximately 80 to 120 P.S.I.

In preferred embodiments, the first chamber of the tank is disposed below the second chamber. Also, in preferred embodiments, aperture means are disposed centrally with respect to the longitudinal axis of the tank. Such aperture means may have a standpipe disposed on and extending upwardly therefrom.

In preferred embodiments, the oxygen-containing gas may comprise air, or may comprise oxygen, or other gaseous mixtures containing substantial portions of oxygen. Such oxygen-containing gas is preferably pressurized to at least approximate 80 to 120 P.S.I. The treated water output means in preferred embodiments is disposed below the level of water contained within the second chamber of the tank.

Such oxidizable matter contained within the waste water may be of the type having substantial biochemical oxygen demand. Such waste water may contain human sewage.

The recirculation water means may include a recirculation water pump. Such recirculation water means is preferably disposed on the first chamber of the tank for withdrawing a stream of recirculation water therefrom.

In preferred embodiments, a plurality of such venturi means is disposed about the periphery of the tank, and preferably in equally disposed array. In some preferred embodiments, four such venturi means may disposed about the periphery of the tank 90° apart.

Water level control means are provided for such tank in preferred embodiments. Such water level control means function to maintain a head space within the tank of oxygen-containing gas. Such head space of preferred embodiments may comprise approximately one-third of the longitudinal dimension of the tank.

The pressurized oxygen-containing stream from the venturi means in preferred embodiments may include approximately at least approximately 3,000 P.P.M. of dissolved oxygen or greater amounts in other preferred embodiments.

The respective flows from the treatment water input means, and the combined injection stream of pressurized water which is super-saturated with oxygen, such combined stream emanating from said venturi means and injected into the tank, are intimately mixed within the tank. Such respective streams preferably mix by means of intersecting streams within the tank.

The biochemical oxygen demand in preferred embodiments of the improved high pressure oxygen-saturated water treatment apparatus of the present invention may be reduced by at least approximately 90 per cent.

The venturi means in preferred embodiments further includes a venturi pressure pump for supplying supplemental pressure to the output therefrom.

The pressure inside the tank in preferred embodiments is preferably a lower pressure than the pressure of the pressurized oxygen-containing stream within the venturi means, and thus dissolved oxygen will come out of solution within the tank. In preferred embodiments, when such dissolved oxygen comes out of solution, it does so preferentially about any suspended sludge particles within the treatment water, thus entraining the suspended sludge particles and providing supplemental floatation thereto. The standpipe in such preferred embodiments is disposed about the aperture in the chamber separation means and extends to a longitudinal dimension which may be approximately one-third of the longitudinal dimension of the tank.

The venturi means are disposed for injecting the pressurized water which is super-saturated with oxygen at a level of approximately one-third of the distance from the bottom of the tank to the top thereof. The treated water output means are disposed at approximately the midpoint of the longitudinal dimension of the tank. Such standpipe preferably extends slightly above the horizontal center of the tank.

In preferred embodiments of the improved high pressure oxygen-saturated water treatment apparatus of the present invention, such venturi means is preferably disposed on the discharge side of the venturi pressurized pump.

One preferred embodiment of the venturi means for use in connection with the improved high pressure oxygen-saturated water treatment apparatus of the present invention includes a venturi housing containing a gas-liquid mixing container disposed therewithin. Such gas-liquid mixing container defines an exteriorly disposed gas chamber and an interiorly disposed liquid chamber for receipt of water thereinto. Such gas-liquid mixing container further defines gas openings in the walls of said mixing container for flowing of the oxygen-containing gas therethrough under substantial pressure to mix with the water within and flowing through the liquid chamber.

Gas input means are disposed on the venturi housing for providing oxygen-containing gas to the gas chamber. Liquid input means are provided for providing water to and to flow through the liquid chamber. A mixture injection chamber is connected to the venturi housing and is provided for channeling the mixed oxygen-containing pressurized gas and water injection mixture in a direction generally longitudinal of the gas-liquid mixing chamber.

Also provided are substantially smoothly contoured contraction means disposed within the venturi housing and for conveying the water in a longitudinal path into and through the gas-liquid mixing container and for increasing the velocity of the water exiting from the contoured contraction means. Such smoothly contoured contraction means preferably comprises a substantially frusto-conical initial chamber and passing into a connected substantially cylindrical second chamber of reduced diameter. The smoothly contoured contraction means is preferably defined by a fitting for disposition within the mouth of the gas-liquid mixing chamber. At least a portion of the exterior shape of such fitting is frusto-conical in shape. Also, such frusto-conical exterior shape of the fitting comprising the smoothly contoured contraction means is disposed within the gas-liquid chamber.

The venturi means may further comprise a gas-liquid mixture reception means for receiving the highly oxygenated water from the gas-liquid chamber. Such gas-liquid reception means is disposed within the gas-liquid mixing container and downstream of the gas openings therein. Such gas-liquid mixture reception means further includes, in preferred embodiments, a substantially frusto-conical pickup mouth channeling into a connected substantially cylindrical output mouth means for directing the stream of oxygen-enriched water into the mixture injection chamber. Such substantially cylindrical output mouth means in preferred embodiments may be of reduced diameter as compared with the larger diameter of the frusto-conical pickup mouth for increasing the velocity thereof preparatory to injection of the substantially oxygen-enriched stream of water into the mixture injection chamber. In such preferred embodiments, the interior diameter of the output means of the gas-liquid reception means is of larger interior diameter than that of the most adjacent portion of the liquid input means.

In preferred embodiments of the improved high pressure oxygen-saturated water treatment apparatus of the present invention, the venturi housing may be substantially cylindrical in shape. Also, the gas-liquid mixing container may be substantially cylindrical in shape. Such gas-liquid mixing chamber in preferred embodiments preferably includes a plurality of slots in the walls thereof for passage of oxygen-containing gas therethrough. Such slots in preferred embodiments are elongated in shape and are disposed substantially parallel to the longitudinal axis of the gas-liquid mixing chamber. In such preferred embodiments such slots are disposed in substantially equally spaced array about the circumference of the gas-liquid chamber.

In preferred embodiments, the mixture injection chamber is also cylindrical in shape. The transverse cross-sectional area of the mixture injection chamber is preferably less than that of the gas-liquid mixing container. The length of the mixture injection chamber is in preferred embodiments substantially greater than the length of the venturi housing. Also, in preferred embodiments, the mixture injection chamber further comprises relief openings in the walls thereof near the distal end thereof, and which distal end includes a discharge portion thereof.

Figures 2, 3:
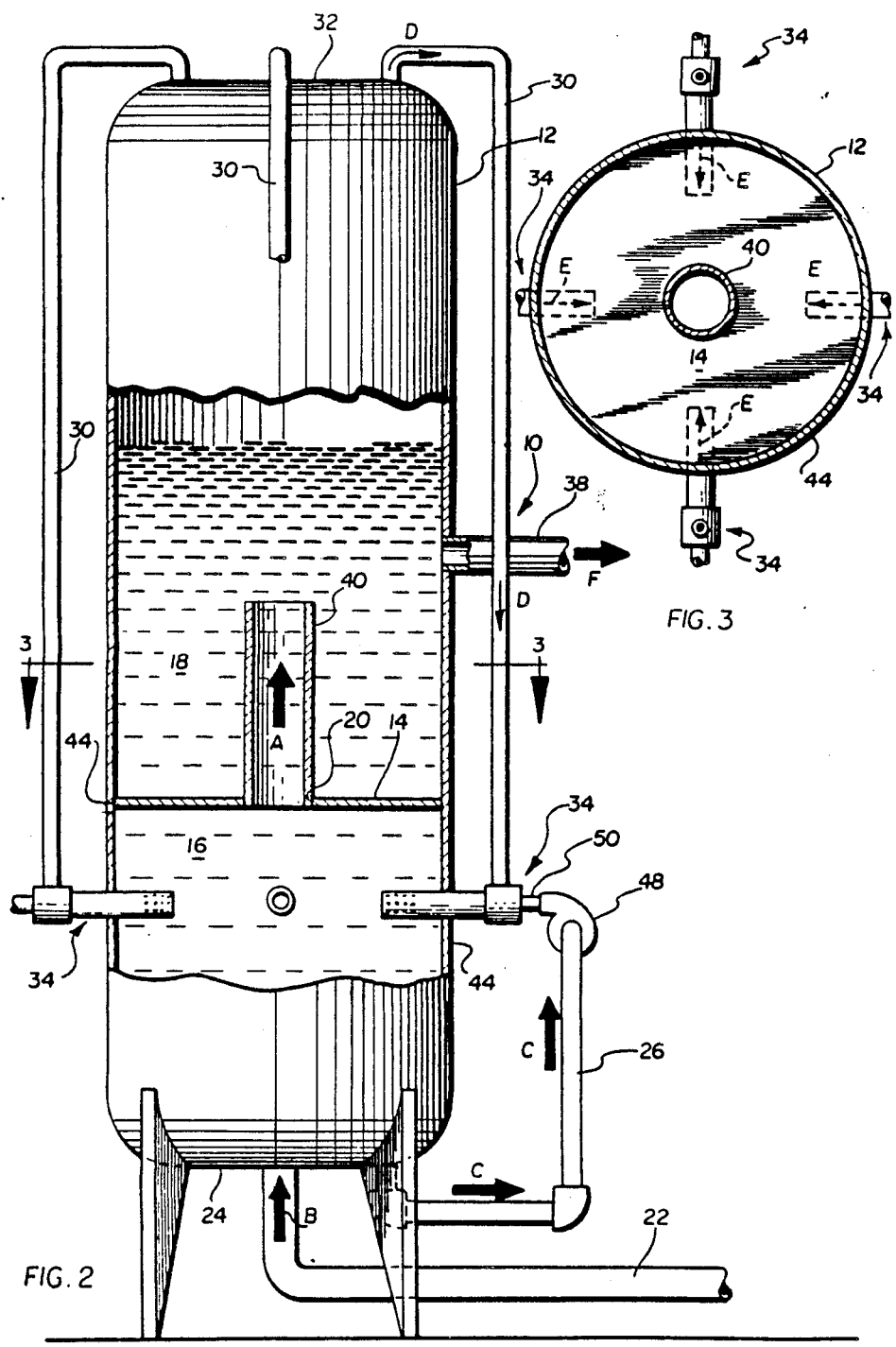
FIG. 2 is an enlarged side elevational view of improved high pressure oxygen-saturated water treatment apparatus of the present invention as depicted in claim 1, and further showing the oxygen output means disposed on the tank for receiving the pressurized oxygen-containing gas from the top of the pressurized treatment tank and for directing such pressurized oxygen-containing gas into the venturi, and also showing recirculation water means for feeding into the venturi means for combining such recirculation water stream under pressure with the stream of super-saturated and pressurized oxygen to form an injectable stream of pressurized water, which is shown injected into the pressurized treatment tank at a plurality of (here four) equally spaced circumferential points about the periphery of the pressurized treatment tank.
FIG. 3 is a transverse cross-sectional view of the improved high pressure oxygen-saturated water treatment apparatus embodiment of FIG. 2 taken along lines 3—3 thereof, and further showing the internal circulation means thereof.

Referring now to the drawing and to FIGS. 1, 2 and 3 in particular, the improved high pressure oxygen-saturated water treatment apparatus generally 10 of the present invention functions to provide super-saturated oxygen treatment water, such as various forms of waste water, and in some preferred embodiments containing organic materials. Such apparatus includes a pressurized treatment tank 12 having a substantial longitudinal dimension as shown in FIGS. 1 and 2. Tank 12 may be supported by legs 13 of suitable dimensions, materials and strength. A chamber separation plate 14 is disposed within pressurized treatment tank 12 for defining two interconnected chambers 16,18 within tank 12. Chamber separation plate 14, preferably in the form of a transversely disposed metal plate, includes an aperture 20 therein for permitting the flow of water therethrough from first chamber 16 to second chamber 18 (See Arrow A). A treatment water input conduit 22 is disposed on tank 12 for input of treatment water into first chamber 16 of the pressurized treatment tank 12 at the bottom 24 thereof (See Arrow B). Recirculation water conduit 26 is also disposed on tank 12 also at bottom 24 for receiving a stream of recirculation water from tank 12 (See Arrow C), and preferably from the bottom 24, as shown in FIGS. 1 and 2. An oxygen input conduit 28 is also connected to tank 12 for providing oxygen-containing gas into the tank and for maintaining such oxygen-containing gas under substantial pressure within tank 12. Such oxygen input conduit 28 may be connected to a compressor and to feed into treatment water input conduit 22, or in alternative embodiments may feed directly into tank 12. An oxygen output conduit 30 is disposed on tank 12 and at top portion 32 thereof for receiving the pressurized oxygen-containing gas from tank 12 to form a pressurized oxygen-containing stream contained within oxygen output conduit 30 (See Arrow D).

A venturi generally 34 is disposed on tank 12 for receiving and combining the pressurized oxygen-containing stream (See Arrow D) with the recirculation water stream (See Arrow C), and under substantial pressure, to form a combined injection stream 36 (See Arrow E of FIG. 4) of pressurized water which is super-saturated with oxygen, and which combined injection stream is injected into the treatment water contained within tank 12 for substantially oxidizing any oxidizable material contained within such treatment water. Such combined stream 36 is injected in preferred embodiments into the first chamber 16 of tank 12.

A treated water output conduit 38 is also disposed on tank 12 for output of treated water (See Arrow F), which contains substantially reduced levels of oxidizable contaminants, such treated water output preferably from second chamber 18 of tank 12.

Pressurized treatment tank 12 is substantially cylindrical in preferred embodiments in external configuration, and may be pressurized to at least approximately 80 to 120 P.S.I.

First chamber 16 of tank 12 is disposed below second chamber 18 as shown in FIG. 1. Aperture 20 is disposed centrally with respect to the longitudinal axis of tank 12. Such aperture 20 may have a standpipe 40 disposed on and extending upwardly therefrom, as shown in FIG. 1.

As shown in FIG. 2, treated water output conduit 38 is disposed below the level of water contained within second chamber 18 of tank 12.

As shown in FIG. 1, recirculation water conduit 26 may include a recirculation water pump 48. Such recirculation water conduit 26 is preferably disposed on first chamber 16 of tank 12 for withdrawing a stream of recirculation water therefrom (See Arrow C).

As shown in FIG. 2, a plurality of such venturis 34 are disposed about periphery 44 of tank 12, and preferably in equally disposed array. In some preferred embodiments, as shown in FIG. 2 such venturis 34 may be disposed about periphery 44 of tank 12 and 90° apart.

Water level control means, such as for example in the form of a McDonald valve, are provided for such tank 12. Such water level control valve (not shown) functions to maintain a head space 46 within tank 12 of the oxygen-containing gas. Such head space 46 of preferred embodiments may comprise approximately one-third of the longitudinal dimension of tank 12, as shown in FIG. 1.

The pressurized oxygen-containing stream from the venturi means in preferred embodiments may include at least approximately 3,000 to 4,000 P.P.M. of dissolved oxygen, or greater amounts in other preferred embodiments.

The respective flows from the treatment water input conduit 22 and the combined injection stream 36 of pressurized water which is super-saturated with oxygen, such combined stream 36 emanating from each venturi 34 and injected into tank 12, are intimately mixed within tank 12, and these respective streams preferably mix by means of intersecting within tank 12.

The biochemical oxygen demand in preferred embodiments of the improved high pressure oxygen-saturated water treatment apparatus 10 of the present invention are reduced by at least approximately 90 per cent.

As shown in FIGS. 1 and 2, venturi 34 further includes a venturi pressure pump 48 for supplying supplemental pressure to the output therefrom.

The pressure inside tank 12 in preferred embodiments is preferably a lower pressure than the pressure of the pressurized oxygen-containing stream within venturi 34, and thus dissolved oxygen will come out of solution within tank 12 upon injection of such combined injection stream 36 into tank 12. When such dissolved oxygen comes out of solution, it does so preferentially about any suspended sludge particles within the treatment water, thus entraining the suspended sludge particles and providing supplemental floatation thereto Standpipe 40 in such preferred embodiments is disposed about aperture 20 in chamber separation plate 14 extends to a longitudinal dimension which may be approximately one-third of the longitudinal dimension of tank 12.

Venturis 34 are disposed for injecting the pressurized water which is super-saturated with oxygen at a level of approximately one-third of the distance from bottom 24 of tank 12 to top 46 thereof. The treated water output conduits 38 are disposed at approximately the midpoint of the longitudinal dimension of tank 12. Such standpipe 40 preferably extends slightly above the horizontal center of tank 12.

In preferred embodiments of the improved high pressure oxygen-saturated water treatment apparatus 10 of the present invention, each such venturi 34 is preferably disposed on the discharge side 50 of venturi pressurized pump 48.

As shown in FIGS. 4 and 5, one preferred embodiment of a venturi 34 for use in connection with improved high pressure oxygen-saturated water treatment apparatus 10 of the present invention includes a venturi housing 52 containing a gas-liquid mixing container 54 disposed therewithin. Such gas-liquid mixing container 54 defines an exteriorly disposed gas chamber 56 and an interiorly disposed liquid chamber for receipt of water thereinto. Such gas-liquid mixing container 54 further defines gas openings 59 in walls 60 cf said mixing container 54 for flowing of the oxygen-containing gas therethrough under substantial pressure to mix with the water within and flowing through liquid chamber 58. The pressure of gas within gas chamber 56 must be sufficiently great to prevent backup of treatment water thereinto from liquid chamber 58.

A gas input opening 62 is disposed on venturi housing 52 for providing oxygen-containing gas to gas chamber 56. A liquid input opening is provided for providing water to and to flow through liquid chamber 58. A mixture injection chamber 64 is connected to venturi housing 52 and is provided for channelling the mixed oxygen-containing pressurized gas and water injection mixture in a direction generally longitudinally of the gas-liquid mixing container 54, as shown generally at Arrow E.

Also shown in FIGS. 4 and 5 is a substantially smoothly contoured contraction 66 disposed within venturi housing 52 and for conveying the water in a longitudinal path into and through gas-liquid mixing container 54 and for increasing the velocity of the water exiting from the contoured contraction 66. Such smoothly contoured contraction 66 preferably comprises a substantially frusto-conical initial chamber 68 and passing into a connected substantially cylindrical second chamber 70 of reduced diameter. Smoothly contoured contraction 66 is preferably defined by a fitting generally 72 for disposition within mouth 74 of gas-liquid mixing container 54. At least a portion 76 of the exterior shape of fitting 72 is frusto-conical in shape. Such frusto-conical exterior shape 76 of fitting 72 comprising smoothly contoured contraction 66 is disposed within the gas-liquid mixing container 54.

Venturi 34 may further comprise a gas-liquid mixture reception element generally 78 for receiving the highly oxygenated water from liquid chamber 58. Such gas-liquid reception element 78 is disposed within gas-liquid mixing container 54 and downstream of gas openings 59 therein. Such gas-liquid mixture reception element 78 further may include, as shown, a substantially frusto-conical pickup mouth 80 channelling into a connected substantially cylindrical output mouth 82 for directing the stream (See Arrow G) of oxygen-enriched water into mixture injection chamber 64. Such substantially cylindrical output mouth 82 may be of reduced diameter as compared with the larger diameter of the frusto-conical pickup mouth 80 for increasing the velocity thereof preparatory to injection of the substantially oxygen-enriched stream of water into mixture injection chamber 64.

In preferred embodiments of the improved high pressure oxygen-saturated water treatment apparatus 10 of the present invention, such venturi housing 52 may be substantially cylindrical in shape. Also, the gas-liquid mixing container 54 may be substantially cylindrical in shape. Such gas-liquid mixing container 54 in preferred embodiments preferably includes a plurality of slots 59 in walls 60 thereof for passage of oxygen-containing gas therethrough. As shown in FIG. 5, such slots 59 in preferred embodiments are elongated in shape and are disposed substantially parallel to the longitudinal axis of gas-liquid mixing container 54. In such preferred embodiments such slots 59 are disposed in substantially equally spaced array about the circumference of the gas-liquid mixing container 54.

In such preferred embodiments, as shown, the mixture injection chamber 64 is also cylindrical in shape. The transverse cross-sectional area of mixture injection chamber 64 is preferably less than that of gas-liquid mixing container 54. The length of mixture injection chamber 64 is in preferred embodiments substantially greater than the length of venturi housing 52. Also, in preferred embodiments, mixture injection chamber 64 further comprises relief openings 84 in the walls thereof near distal end 86 thereof, and which distal end 86 includes a discharge portion 88 thereof.

While the various dimensions of the various components of the improved high pressure oxygen-saturated water treatment apparatus of the present invention may vary, such dimensions may be determined without undue experimentation and from the disclosure, drawings and claims hereof. Tank 12 may preferably include as headspace 46 at least approximately 2 feet of oxygen-containing gas at top thereof. The compressor 45 for supplying oxygen-containing gas to such oxygen input conduit may preferably comprise an at least 2 horse power air compressor. The water pump 42 for supplying waste water to the treatment water input conduit 22 may in preferred embodiments comprise at least a 3 horsepower high duty pump, and the pump (not shown) connected to the treated water output conduit 38 for removing treated water from second chamber 18 of tank 12 may also comprise at least a 2 to 3 horse power high duty head pump. Each of venturi pumps 48 may preferably comprise at least a one-half horse power mixing motor.

In such preferred embodiments, tank 12 itself may be approximately 114 inches in length, with each such venturi 34 disposed for injection at a level of approximately 27 inches above bottom 24 of tank 12 and within first chamber 16 thereof.

Whereas the treatment water input conduit 22 should preferably comprise at least a 2 inch pipe, in some preferred embodiments the recirculation water conduit 26 may comprise at least a 1¼ inch pipe, whereas oxygen output conduit 30 should comprise at least approximately 1 inch pipe. Steel, and preferably stainless steel, elements are preferred although other materials may likewise be satisfactory. Such dimensions are deemed to be merely illustrative of certain preferred embodiments of the apparatus of the present invention and are not in any sense to be critical.

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An improved high pressure oxygen-saturated water treatment apparatus for providing supersaturated oxygen treatment to water, said apparatus comprising:

a pressurized treatment tank having a substantial longitudinal dimension and having a selected liquid level therein;

chamber separation means disposed within said pressurized treatment tank and beneath the selected liquid level thereof for defining two connected liquid containing chambers therewithin, said chamber separation means including aperture means thereon for permitting the flow of water from a first chamber to a second chamber, wherein said first chamber of said pressurized treatment tank is disposed below said second chamber thereof;

treatment water input means disposed on said pressurized treatment tank for input of a treatment water stream into said first chamber thereof;

recirculation water means disposed on said pressurized treatment tank for receiving a stream of recirculation water therefrom;

oxygen input means disposed on said pressurized treatment tank for providing oxygen-containing gas into said pressurized treatment tank and for maintaining said oxygen containing-gas under substantial pressure within said pressurized treatment tank;

oxygen output means disposed on said pressurized treatment tank for receiving pressurized oxygen-containing gas therefrom to form a pressurized oxygen-containing stream;

venturi means disposed on said pressurized treatment tank for receiving and combining said pressurized oxygen-containing stream with said recirculation water stream under pressure to form a combined injection stream of pressurized water which is super-saturated with oxygen for injection into the treatment tank;

means for injecting the combined injection stream into said first chamber of said tank for substantial intersection with the treatment water stream from said treatment water input means; and treated water output means disposed on said pressurized treatment tank for output of treated water from said second chamber thereof.

2. The improved high pressure oxygen-saturated water treatment apparatus of claim 1 wherein said oxygen output means is disposed near the top of said pressurized treatment tank.

3. The improved high pressure oxygen-saturated water treatment apparatus of claim 1 wherein said pressurized treatment tank is substantially cylindrical in external configuration.

4. The improved high pressure oxygen-saturated water treatment apparatus of claim 1 further comprising means for pressurizing said pressurized treatment tank to approximately 80 to 120 P.S.I.

5. The improved high pressure oxygen-saturated water treatment apparatus of claim 1 wherein said aperture means is disposed centrally with respect to the longitudinal axis of said pressurized treatment tank.

6. The improved high pressure oxygen-saturated water treatment apparatus of claim 1 further comprising stand pipe means disposed on and upwardly extending from said aperture means.

7. The improved high pressure oxygen-saturated water treatment apparatus of claim 1 further comprising means for pressurizing said oxygen-containing gas to at least approximately 80 to 120 P.S.I.

8. The improved high pressure oxygen-saturated water treatment apparatus of claim 1 wherein said treated water output means is disposed below the level of water contained within said second chamber of said pressurized treatment tank.

9. The improved high pressure oxygen-saturated water treatment apparatus of claim 1 wherein said recirculation water means includes a recirculation water pump.

10. The improved high pressure oxygen-saturated water treatment apparatus of claim 1 wherein said recirculation water means is disposed on said first chamber of said pressurized treatment tank for withdrawing a stream of recirculation water therefrom.

11. The improved high pressure oxygen-saturated water treatment apparatus of claim 1 wherein a plurality of said venturi means are disposed about the periphery of said pressurized treatment tank.

12. The improved high pressure oxygen-saturated water treatment apparatus of claim 11 wherein said venturi means are disposed in substantially equal array about the periphery of said pressurized treatment tank.

13. The improved high pressure oxygen-saturated water treatment apparatus of claim 1 wherein four said venturi means are equally disposed about the periphery of said pressurized treatment tank.

14. The improved high pressure oxygen-saturated water treatment apparatus of claim 1 further comprising pressurized treatment tank water level control means for controlling the level of water within said tank.

15. The improved high pressure oxygen-saturated water treatment apparatus of claim 14 wherein said water level control means maintains a head space within said pressurized treatment tank of oxygen-containing gas.

16. The improved high pressure oxygen-saturated water treatment apparatus of claim 15 wherein said head space comprised approximately one-third of the longitudinal dimension of said pressurized treatment tank.

17. The improved high pressure oxygen-saturated water treatment apparatus of claim 1 wherein said venturi means further includes a venturi pressure pump for supplying supplemental pressure to the output therefrom.

18. The improved high pressure oxygen-saturated water treatment apparatus of claim 1 further comprising means for maintaining the pressure inside the tank at a lower pressure than the pressure of the pressurized oxygen-containing stream within the venturi means for permitting dissolved oxygen to come out of solution.

19. The improved high pressure oxygen-saturated water treatment apparatus of claim 1 wherein said stand pipe extends to a longitudinal dimension which is approximately one-third of the longitudinal dimension of said pressurized treatment tank.

20. The improved high pressure oxygen-saturated water treatment apparatus of claim 1 wherein said venturi means are disposed for injecting said pressurized water which is super-saturated with oxygen at a level of approximately one-third of the distance from the bottom of said pressurized treatment tank to the top thereof.

21. The improved high pressure oxygen-saturated water treatment apparatus of claim 1 wherein said treated water output means are disposed at approximately the mid-point of the longitudinal dimension of said pressurized treatment tank.

22. The improved high pressure oxygen-saturated water treatment apparatus of claim 1 wherein said stand pipe extends slightly above the horizontal center of said pressurized treatment tank.

23. The improved high pressure oxygen-saturated water treatment apparatus of claim 17 wherein said venturi means is disposed on the discharge side of said venturi pressurized pump.

24. The improved high pressure oxygen-saturated water treatment apparatus of claim 1 wherein said pressurized treatment tank is vertically disposed.

25. The improved high pressure oxygen-saturated water treatment apparatus of claim 1 wherein said venturi means comprises:

a venturi housing;

a gas-liquid mixing container disposed within said venturi housing and defining an exteriorly disposed gas chamber for receipt of oxygen-containing gas thereinto and an interiorly disposed liquid chamber for receipt of water thereinto, and said gas-liquid mixing container further defining gas openings in the walls of said mixing container for flowing of the oxygen-containing gas therethrough under pressure to mix with the water within and flowing through said liquid chamber to form such combined injection stream;

gas input means disposed on said venturi housing for providing oxygen-containing gas to said gas chamber;

liquid input means for providing water to and to flow through said liquid chamber; and a mixture injection chamber connected to said gas-liquid mixing chamber for receipt of such combined injection stream and for channelling such combined injection stream in a direction generally longitudinal of said gas-liquid mixing chamber for injection within said pressurized treatment tank.

26. The improved high pressure oxygen-saturated water treatment apparatus of claim 25 wherein further comprising substantially smoothly contoured contraction means disposed within said venturi housing and for conveying the water in a longitudinal path into and through said gas-liquid mixing container, and for increasing the velocity of the water exiting from said contoured contraction means.

27. The improved high pressure oxygen-saturated water treatment apparatus of claim 26 wherein said smoothly contoured contraction means comprises a substantially frusto-conical initial chamber and passing into a connected substantially cylindrical second chamber of reduced diameter.

28. The improved high pressure oxygen-saturated water treatment apparatus of claim 27 wherein said smoothly contoured contraction means is defined by a fitting for disposition within the mouth of said gas-liquid mixing chamber.

29. The improved high pressure oxygen-saturated water treatment apparatus of claim 28 wherein said fitting further includes at least a portion of the exterior shape of which is frusto-conical in shape.

30. The improved high pressure oxygen-saturated water treatment apparatus of claim 29 wherein said frusto-conical exterior shape of said fitting is disposed within said gas-liquid chamber.

31. The improved high pressure oxygen-saturated water treatment apparatus of claim 25 further comprising a gas-liquid mixture reception means for receiving the oxygen-containing water from said gas-liquid chamber, said gas-liquid reception means disposed within said gas-liquid mixing container and downstream said gas openings thereof.

32. The improved high pressure oxygen-saturated water treatment apparatus of claim 31 wherein said gas-liquid mixture reception means further includes a substantially frusto-conical pickup mouth channelling into a connected substantially cylindrical output mouth means for directing the stream of oxygen-containing water into said mixture injection chamber.

33. The improved high pressure oxygen-saturated water treatment apparatus of claim 32 wherein said substantially cylindrical output mouth means is of a reduced diameter as compared with the larger base diameter of said frusto-conical pickup mouth for increasing the velocity thereof preparatory to injection of the oxygen-containing stream of water into said mixture injection chamber.

34. The improved high pressure oxygen-saturated water treatment apparatus of claim 33 wherein the interior diameter of said output means of said gas-liquid reception means is of larger interior diameter than that of the most adjacent portion of said liquid input means.

35. The improved high pressure oxygen-saturated water treatment apparatus of claim 25 wherein said gas-liquid mixing chamber includes a plurality of slots in the walls thereof for passage of oxygen-containing gas therethrough.

36. The improved high pressure oxygen-saturated water treatment apparatus of claim 35 wherein said slots are elongated in shape and are disposed substantially parallel to the longitudinal axis of said gas-liquid mixing chamber.

37. The improved high pressure oxygen-saturated water treatment apparatus of claim 35 wherein said slots are disposed in substantially equally spaced array about the circumference of said gas-liquid chamber.

38. The improved high pressure oxygen-saturated water treatment apparatus of claim 25 wherein said mixture injection chamber is substantially cylindrical in shape.

39. The improved high pressure oxygen-saturated water treatment apparatus of claim 25 wherein the transverse cross-sectional area of said mixture injection chamber is less than that of said gas-liquid mixing container.

40. The improved high pressure oxygen-saturated water treatment apparatus of claim 25 wherein said mixture injection chamber further comprises relief openings in the walls thereof near the distal end thereof.

41. The improved high pressure oxygen-saturated water treatment apparatus of claim 25 wherein said mixture injection chamber further comprises a discharge opening at the distal end thereof.

42. The improved high pressure oxygen-saturated water treatment apparatus of claim 1 wherein said venturi housing is substantially cylindrical in shape.

43. The improved high pressure oxygen-saturated water treatment apparatus of claim 1 wherein said gas-liquid mixing container is substantially cylindrical in shape.

44. The improved high pressure oxygen-saturated water treatment apparatus of claim 1 wherein the length of said mixture injection chamber is substantially greater than the length of said venturi housing.

* * * * *